A. & G. WOEBER.
Thill-Coupling.
No 55,191. Patented May 29, 1866.
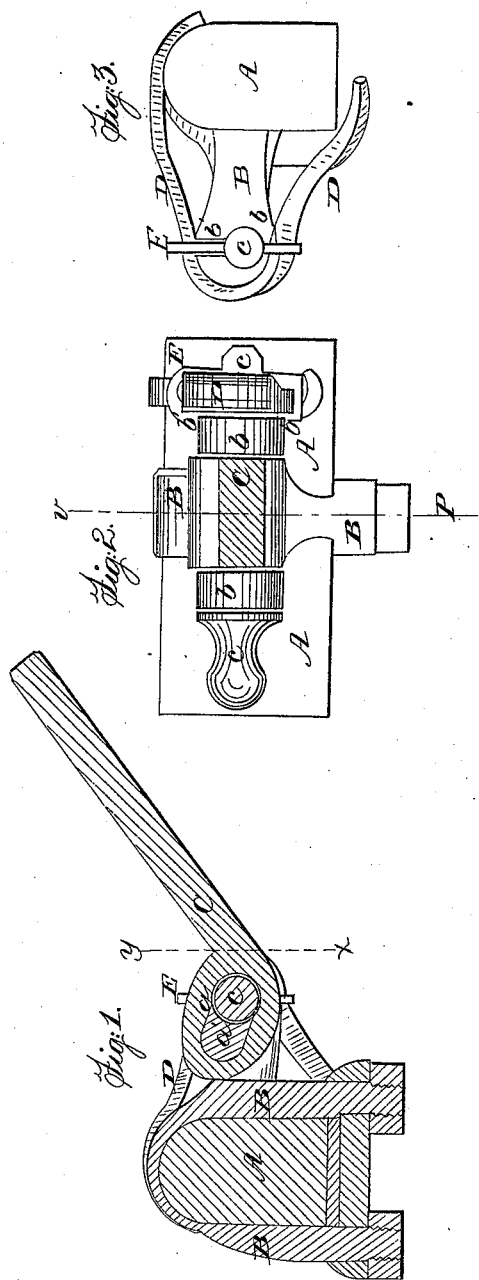

UNITED STATES PATENT OFFICE.

A. WOEBER AND G. WOEBER, OF DAVENPORT, IOWA.

IMPROVEMENT IN THILL-COUPLINGS.

Specification forming part of Letters Patent No. 55,191, dated May 29, 1866.

*To all whom it may concern:*

Be it known that we, A. WOEBER and G. WOEBER, of the city of Davenport, in the county of Scott and State of Iowa, have invented a new and useful Improvement in Thill-Couplings; and we do hereby declare the following to be a full, clear, and exact description of the construction and opereation of the same, reference being had to the accompanying drawings, making a part of this specification, in which—

Figure 1 is a vertical sectional view of our improved thill-coupling, as indicated by line $p$ $v$ in Fig. 2; Fig. 2, section of thill-iron as indicated by the line $x$ $y$ in Fig. 1; Fig. 3, view of axle and clip, strap, and key for holding bolt.

Like letters in all the figures of the drawings indicate like parts.

The nature of our invention has reference to a simple method of preventing the friction or unpleasant rattling noise of the thill or shaft iron in its connection with the clip on the axle by the construction of an oblong or other shaped slot in the rear of the bolt holding the thill-iron to the clip and the insertion and application of india-rubber therein to the rear and around a portion of the bolt, whereby the said india-rubber, when the thill is elevated to the proper position for use, acts as a spring in keeping the eye or eccentric form of the thill well against the clip, and thus accomplishes the object as mentioned above.

Another feature of our invention consists in a better method than heretofore of securing the bolts while in the clip. Instead of the screw-nut to hold the same, we construct a slot in and near the end of the bolt and place therein a key attached to a strap, which strap is attached to the axle, the object and the advantage of which will be stated more fully hereinafter.

To enable any one skilled in the art to make and use our invention, we will proceed to describe its construction and operation.

A is the axle; B, the clip; C, the thill-iron; D, strap; E, key.

The thill-iron is constructed in the ordinary manner with this exception: Instead of the bolt-hole being made in the usual manner an oblong or other shaped hole or slot is made, (see $a$, Fig. 1,) extending rearward from the point at which the bolt is introduced. The space within the slot around the bolt is filled by the introduction of india-rubber, $a'$, such as is used for the purpose of a spring. The thill-iron is then placed between the sides of the clip $b$ $b$, (see clearly Fig. 2,) and the bolt $c$ run through and made fast by the key, which will be presently described.

It will thus be seen that when the thill is elevated to the proper position for use the action of the eye or eccentric form of the thill bearing on or against the clip compresses the india-rubber between the bolt and rear end of the slot, and consequently the bolt is kept perfectly tight in its place, the pressure of the rubber against it keeping it well against the front end of the slot, and all rattling, friction, or looseness of the same are thereby prevented.

The application of the rubber as a spring is so simple in its connection with the slot as constructed that when the same loses its elasticity and flexibleness from usage it can be replaced with but little trouble.

The bolts now in use are held in their places by the ordinary screw-nuts. It has been found that when the bolt has been in use some time the screw-threads becoming worn, from repeated displacements of the bolt or otherwise, the nut comes off and frequently lost, requiring the use of cord or string, or whatever is convenient at the time, to secure the bolt and prevent its coming out.

Now, the object of the key is obvious. A suitable-sized slot is made in and near the end of the bolt, close to the outer edge of the side of the clip. The key, as herein indicated by letter, is placed therein, fitting into a small groove, $b'$, on the side of the clip, to prevent it and the bolt turning, and thus relieve the friction produced by the turning of the bolt in the holes of the clip, which, however great rubber springs or other contrivances may have been used heretofore to prevent it, has to a more or less extent proved ineffectual. This arrangement of the key fitting into the groove and the bolt will effectually prevent it.

The key has a strap attached to it, being passed through a hole in the same, and held by an enlargement of or shoulder being formed on the strap to prevent its slipping through. The end of it is then fastened to the axle. This or a suitable method will answer the purpose as well, the object being simply to hold the key to the strap in the best manner. The other end of the strap is passed through another hole in the key, around and under the bolt, and is there securely held.

The form of the slot and key is such that by a simple tap on the top or bottom of the key it can be tightened or loosened with facility, which will be found to be more convenient than the screw-nuts in the removal of the thills.

Having thus fully described our invention, what we claim therein as new, and desire to secure by Letters Patent, is—

1. The construction of a slot, $a$, in the thill-iron C in the rear and obliquely to the bolt and the application of india-rubber, $a'$, therein as arranged, whereby the eye of the thill-iron is thus made to have a bearing on the clip without any additional device to either one or the other as heretofore, substantially in the manner and for the purpose as herein set forth.

2. The application of the key E and strap D as arranged, in combination with the bolt $c$, substantially in the manner and for the purpose as herein set forth.

GALLUS WOEBER.
AMANDUS WOEBER.

Witnesses:
   JNO. W. THOMPSON,
   GEO. G. ARNOT.